July 2, 1963 W. C. BAKER 3,095,762
REAR AXLE CONSTRUCTION
Filed Aug. 12, 1960 3 Sheets-Sheet 1

INVENTOR.
WILLARD C. BAKER
BY
P. F. Hilder
ATTORNEY

July 2, 1963    W. C. BAKER    3,095,762
REAR AXLE CONSTRUCTION
Filed Aug. 12, 1960    3 Sheets-Sheet 2

INVENTOR.
WILLARD C. BAKER
BY
P. F. Hilder
ATTORNEY

INVENTOR.
WILLARD C. BAKER
BY
P. F. Hilder
ATTORNEY

United States Patent Office 3,095,762
Patented July 2, 1963

3,095,762
REAR AXLE CONSTRUCTION
Willard C. Baker, Columbus, Ohio, assignor to Ford Motor Company, Dearborn, Mich., a corporation of Delaware
Filed Aug. 12, 1960, Ser. No. 49,183
6 Claims. (Cl. 74—720.5)

This invention relates to tractor rear axle constructions. Tractor rear axles frequently comprise a center housing which receives a ring and pinion and differential. The rear axle shaft projects laterally and is received within an axle housing. According to the present invention, a planetary gear reduction unit is interposed between the differential and the wheel, this planetary unit being located at the inner end of each axle shaft adjacent the center housing. In addition, independently actuatable brakes for each rear wheel are located adjacent the planetary unit so as to brake the input shaft of the planetary unit, thus accomplishing braking on the axle before final reduction and, further, leaving the outer ends of the axle housings clear to improve ground clearance.

Among the objects of the present invention are to provide an improved tractor rear axle construction incorporating a planetary gear reduction unit and brake adjacent the tractor center housing, to provide such a construction having an improved type of brake and an improved bearing mounting of the axle shaft, and generally to improve rear axle constructions of the type described.

Other objects, and objects relating to details and economies of manufacture will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Figure 1:
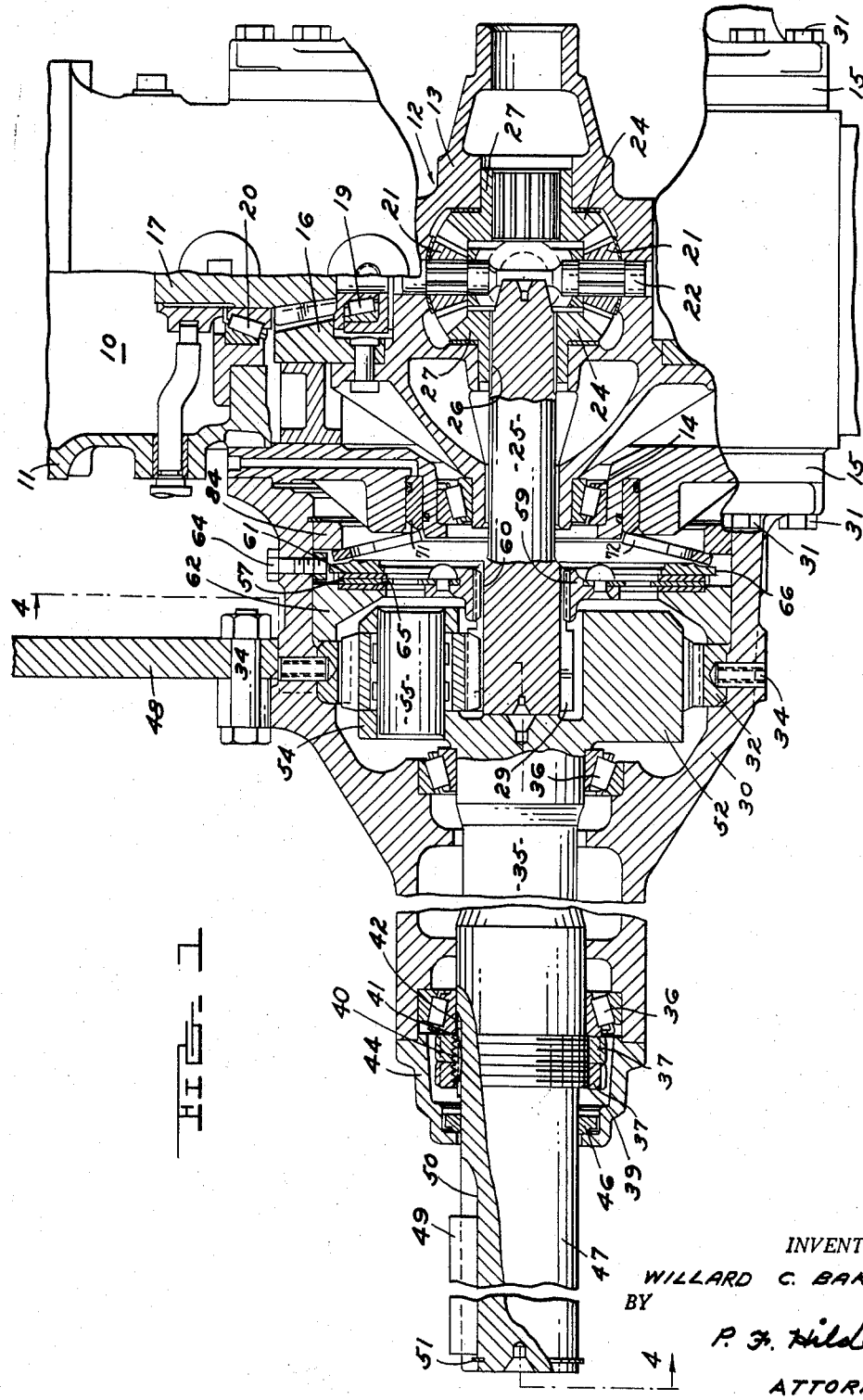
FIGURE 1 is a top plan view of the rear axle assembly and associated parts, portions of the assembly being broken away or shown in cross-section taken through the axis of the assembly.

The rear axle assembly of the present invention is of particular utility for heavier wheel-type tractors. The assembly includes a center housing 10, which is adapted to be connected by a flange 11 to a transmission housing, not shown.

A differential 12 has a carrier or housing 13 rotatably supported within the center housing 10 by a pair of differential carrier bearings located one on each side of the differential, one bearing 14 being shown. The differential bearings are carried in bearing retainer plates 15, 15 which form a portion of the rear axle housing. A ring gear 16 is mounted on the differential carrier 13 and meshes with a pinion 17 which is rotatably supported in the center housing by a pair of pinion bearings 19 and 20.

The differential gears 21, 21 are rotatably mounted on a differential gear shaft 22 located within the differential carrier 13 and mesh with differential side gears 24, 24 rotatably mounted within the carrier 13. The differential, ring and pinion construction is generally conventional.

In the rear axle assembly of the present invention, a planetary reduction unit and brake are incorporated in the axle housings adjacent the center housing. Accordingly, a sun gear shaft extends from each side of the differential, one shaft 25 being shown. The shaft 25 has a splined inner end 26 received within a co-operating splined hub 27 of the differential side gear 24. The shaft 25 extends a short distance beyond the bearing retainer plate 15, and the outer end of the shaft carries a sun gear 29 which preferably is machined as an integral portion of the shaft.

A rear axle housing 30 extends outwardly from the center housing 10 and bearing retainer plate 15, being secured to those parts by a series of bolts 31. A ring gear 32 is supported in the housing 30 in the plane of sun gear 29, being non-rotatably supported in the housing by a pair of pins 34, 34 which are located diametrically opposite each other. These pins may be threaded within the axle housing 30.

An axle shaft 35 is rotatably supported within the axle housing 30 by a pair of bearings 36, 36. The bearings 36, 36 preferably are of the tapered type and are arranged as indicated in the drawings. These bearings are adjusted by a pair of threaded collars or nuts 37, 37 which are threadedly received on a split sleeve 39 which in turn is received in a rounded circumferential groove 40 formed in the axle shaft 35. A key 41 located in a keyway 42 in the shaft 35 holds the sleeve against turning on the shaft. By turning the inside nut 37 against the adjacent bearings 36, the bearings can be adjusted to the proper clearance. The second nut 37 serves to lock the inner ring in adjusted position. This arrangement provides for adjustment of the bearing without the necessity of forming threads on the axle shaft 35 or otherwise providing a point of stress concentration which might cause failure of the shaft in use. The outer end 44 of the axle housing 30 may be made as a separate piece secured to the end of the housing by bolts 45. A shaft seal 46 is located in the outer end 44 of the axle housing to seal against loss of lubricant from the housing.

The rear end 48 of the tractor frame is attached to the rear axle housing 30 generally at the portion of the housing receiving the planetary reduction unit, including the ring gear 32. The outer end 47 of the axle shaft 35 extending beyond the axle housing may be provided with a key 49 received within a keyway 50 for receiving the rear wheel, not shown, of the tractor. A retaining ring 51 of the snap ring type may be provided in a groove at the outer end of the axle shaft if desired to prevent unintentional loss of the wheel from the axle.

The inner end of the axle shaft 35 is provided with a planet gear carrier 52 which preferably is formed integrally with the axle shaft. The planet gear carrier rotatably supports a series of pinions 54, preferably three in number, which are carried by pinion shafts 55 received within the pinion carrier. The pinions 54 mesh with both the ring gear 32 and the sun gear 29 and also center the sun gear and outer end of the sun gear shaft.

The tractor brakes preferably are built into the rear axle assembly between the differential 12 and the planetary reduction gear assembly to operate on the sun gear shaft 25, which rotates at a higher speed and less torque than the axle shaft 35, thus making the brakes more effective.

Figure 2:
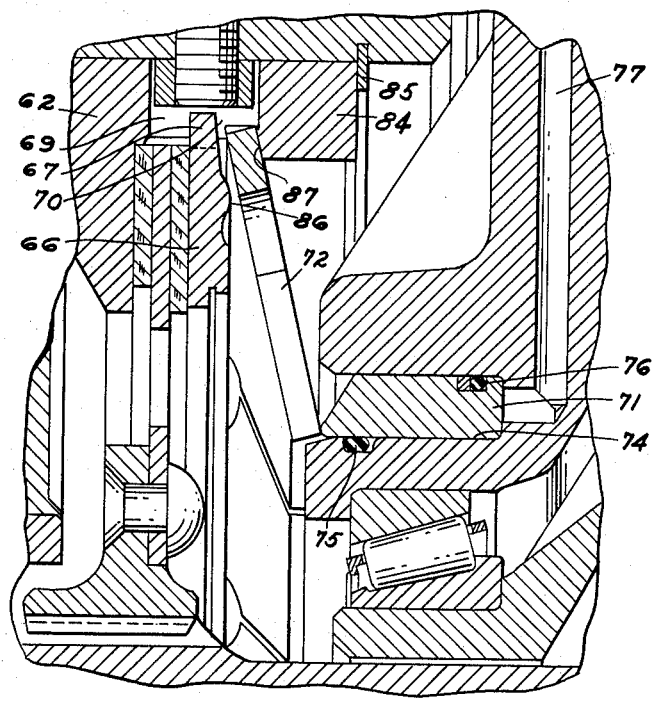
FIGURE 2 is an enlarged half-section of the brake assembly, taken through the sun gear shaft.

According to the present invention, the brake assembly preferably is of the wet disc type and includes a generally flat brake disc 57 which is secured to a brake disc hub 59 splined to the sun gear shaft 25 to provide for axial movement of the disc on the shaft. Preferably, the spline 60 on the sun gear shaft registers with the teeth of the integral sun gear 29 for economy of manufacture. The brake disc 57 is provided with a ring 61 of friction brake material on its two opposite sides. An abutment or ring 62 is fixed within the rear axle housing 30 by at least one bolt and nut 64, the ring telescoping with the housing and being prevented from turning by the bolt. The abutment 62 is provided with a flat braking surface 65 co-operating with the brake material 61 carried by the brake disc 57. A pressure plate 66 is provided on the opposite side of the brake disc 57 to frictionally engage the braking material on the opposite side of the disc. The pressure plate 66 has a series of spaced, radially extending lugs 67 located about its periphery, which are received within a series of correspondingly spaced axially extending slots 69 (see FIGURE 2) formed in an axially extending portion 70 of the ring 62. The arrangement is such that the torque transmitted to the pressure plate by the disc 57 is opposed by the portion 70 of the ring 62.

To apply the brake, the pressure plate 66 is forced against the brake disc 57 by an annular piston 71 and a deformable, cone-shaped brake actuating plate 72. The piston 71, which is concentric with the sun gear shaft 25, is received within an annular slot 74 formed in the differential bearing retainer plate 15. A pair of O rings 75 and 76 seal between the piston and the slot, and a hydraulic fluid passage 77 extends outwardly from the slot 74 to an exterior surface of the bearing retainer plate 15 for connection of a brake hydraulic line, not shown.

Figure 3:
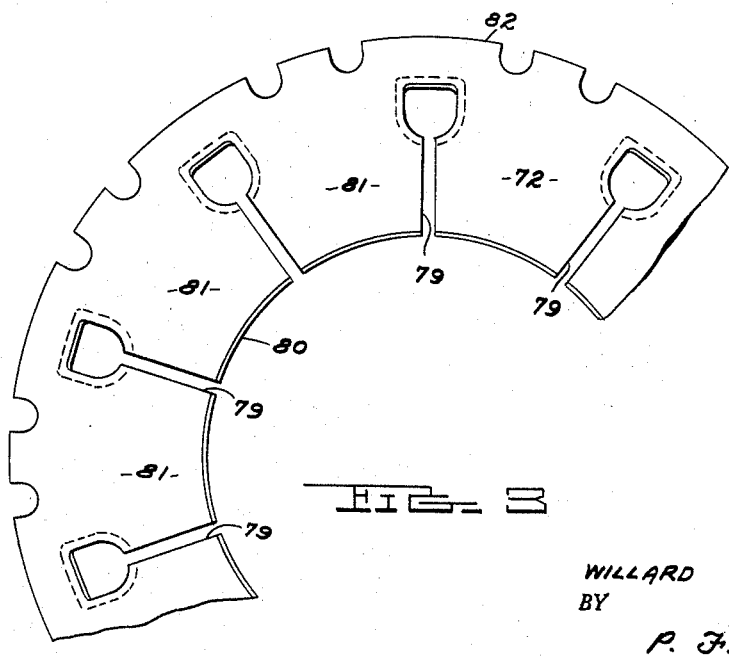
FIGURE 3 is an elevation of the brake spring plate, a portion of the plate being broken away for convenience of illustration.
Figure 4:
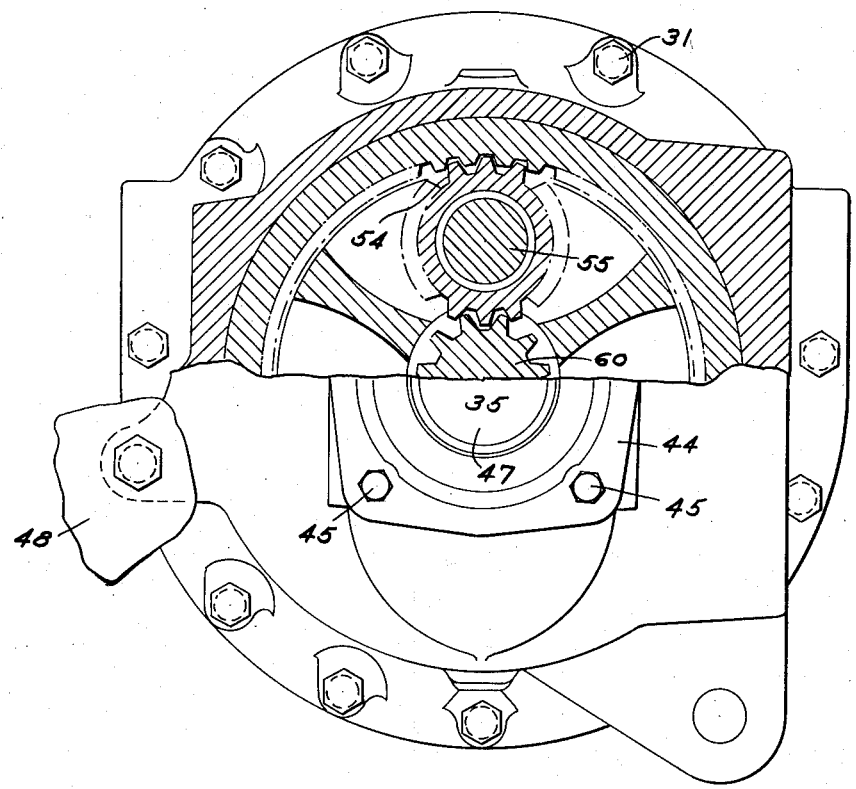
FIGURE 4 is an end elevation of the rear axle assembly, a portion of the assembly being shown in vertical section taken on the line 4, 4 of FIGURE 1.

The brake actuating plate 72 is shown in greater detail in FIGURE 3. This plate is frusto-conical in form and has a series of radially extending slots 79 extending outwardly from the inner periphery 80 of the plate to define a series of interconnected segments or levers 81, the inner ends of which are engaged by the annular piston 71 upon actuation of the brake.

The outer periphery 82 of the plate 72 is received between the outer periphery of the pressure plate 66 and a ring 84 extending about the interior of the rear axle housing 30 beside the portion 70 of the abutment or ring 62. A snap ring 85 engaged with the inner surface of the rear axle housing holds the ring 84 against movement axially of the housing.

The pressure plate 66 is provided with a raised concentric ring 86 for engagement by the brake actuating plate 72. The arrangement is such that actuation of the brake moves the piston 71 to the left as viewed in FIGURE 2, so as to force the brake actuating plate 72 against the pressure plate 66. Further movement of the piston against the inner periphery 80 of the actuating plate tends to flatten the plate somewhat, the individual segments 81 of the plate acting as a series of radially extending levers, the outer ends of which fulcrum on the corner 87 of ring 84 and the intermediate portions of which bear against the ring 86 of the pressure plate so as to communicate a multiplied force of the piston against the pressure plate. Upon release of the brake, the brake actuating plate 72 acts as a spring to return the piston 71 within the slot 74 as the plate resumes its unstressed shape.

I claim:
1. In a tractor rear axle construction, a center housing, a differential within the center housing, a sun gear shaft extending from one side of the differential and having a sun gear on its outer end and a splined portion adjacent the sun gear, a brake disc splined to said portion and movable axially of the shaft, a rear axle housing surrounding the sun gear shaft and having a radially extending surface adapted to be frictionally engaged by one side of the brake disc, an annular piston concentric with the sun gear shaft and supported by the rear axle housing, an annular pressure plate concentric with the shaft and movable against the brake disc, a deformable frusto-conical plate connecting the pressure plate with the piston for actuation thereby, a ring gear fixed to the housing concentric with the sun gear, a rear axle shaft journalled in the axle housing coaxially with the sun gear shaft, the axle shaft having at least one planetary gear mounted on the end thereof adjacent the sun gear shaft and meshing with the sun gear and ring gear to form a speed reduction gearing, the reduction gearing being located a short distance from the differential and the brake disc and pressure plate being located between the ring gear and differential, and the inner end of the axle housing being enlarged and secured to the center housing, the enlarged end of the rear axle housing and the center housing forming a chamber receiving the reduction gearing and brake.

2. In a tractor rear axle construction, a center housing, a differential within the center housing, a bearing retainer plate on opposite sides of the center housing and supporting bearings for carrying the differential, a sun gear shaft extending from one side of the differential and having a sun gear on its outer end and a splined portion adjacent the sun gear, a brake disc splined to said portion and movable axially of the shaft, a rear axle housing surrounding the sun gear shaft and having a radially extending surface adapted to be frictionally engaged by one side of the brake disc, a hydraulic brake piston carried by the bearing retainer plate, an annular pressure plate concentric with the shaft and movable against the brake disc, means for transmitting pressure from the brake piston to the pressure plate, a ring gear fixed to the rear axle housing concentric with the sun gear, and a rear axle shaft journalled in the axle housing coaxially with the sun gear shaft, the axle shaft having at least one planetary gear mounted on the end thereof adjacent the sun gear shaft and meshing with the sun gear and the ring gear to form a speed reduction gearing, the reduction gearing being located a short distance from the differential and the brake disc and pressure plate being located between the ring gear and differential, and the inner end of the axle housing being enlarged and secured to the center housing, the enlarged end of the rear axle housing and the center housing forming a chamber receiving the reduction gearing and brake.

3. In a tractor rear axle construction, a center housing, a differential within the center housing, a sun gear shaft extending from one side of the differential and having a sun gear on its outer end, a brake disc non-rotatably mounted on the sun gear shaft adjacent the sun gear, said brake disc having radially extending braking surfaces on its opposite faces, a rear axle housing surrounding the sun gear shaft, a ring gear fixed to the housing concentric with the sun gear, a pair of annular members non-rotatably mounted within the rear axle housing and having radially extending braking surfaces confronting the brake disc, one of the annular members being fixed in the rear axle between the ring gear and the brake disc and the other being axially displaceable to engage the brake disc and force it against the fixed annular member, a rear axle shaft journaled in the axle housing coaxial with the sun gear shaft, the axle shaft having planetary gears mounted on the end thereof adjacent the sun gear shaft and meshing with the sun gear and ring gear, and actuating means for axially moving the displaceable annular member, the sun and ring gears being spaced laterally a short distance from the differential and the brake disc being interposed between the ring and sun gears and the differential, the inner end of the axle housing being enlarged and secured to the center housing and the enlarged end of the rear axle housing and the center housing forming a chamber receiving the gearing and brake.

4. In a tractor rear axle construction, a center housing, a differential in the center housing, a sun gear shaft extending from one side of the differential and having a sun gear on its outer end, a brake disc nonrotatably mounted on the sun gear shaft adjacent the sun gear, said brake disc having a radially extending braking surface, a rear axle housing projecting laterally outwardly from the center housing and surrounding the sun gear shaft, a ring gear fixed to the rear axle housing concentric with the sun gear, a nonrotating brake member carried by the rear axle housing and engageable against the brake disc to form a brake, a rear axle shaft journalled in the axle housing coaxial with the sun gear shaft, the axle shaft having planetary gears mounted on the end thereof adjacent the sun gear shaft and meshing with the sun gear and ring gear to form a speed reduction gearing, the reduction being located a short distance from the differential and the brake being located between the ring gear and differential, and the inner end of the axle housing being enlarged and secured to the center housing, the enlarged end of the rear axle housing and the center housing forming a chamber beside the center housing receiving the reduction gearing and brake.

5. In a tractor rear axle construction, a center housing, a differential in the center housing, a sun gear shaft extending from one side of the differential and having a sun gear on its outer end, a brake disc nonrotatably mounted on the sun gear shaft adjacent the sun gear, said brake disc having radially extending braking surfaces on its opposite faces, a rear axle housing projecting laterally outwardly from the center housing and surrounding the sun gear shaft, a ring gear fixed to the rear axle housing concentric with the sun gear, a pair of nonrotating brake members carried by the rear axle housing, one on each side of the brake disc and adapted to be engaged against opposite faces of the brake disc to form a brake, a rear axle shaft journalled in the axle housing coaxial with the sun gear shaft, the axle shaft having planetary gears mounted on the end thereof adjacent the sun gear shaft and meshing with the sun gear and ring gear to form a speed reduction gearing, the reduction gearing being located a short distance from the differential and the brake being located between the ring gear and differential, and the inner end of the axle housing being enlarged and secured to the center housing, the enlarged end of the rear axle housing and the center housing forming a chamber beside the center housing receiving the reduction gearing and brake.

6. In a tractor rear axle construction, a center housing, a differential in the center housing, a sun gear shaft extending from one side of the differential and having a sun gear on its outer end, a brake disc splined to the sun gear shaft adjacent the sun gear, said brake disc having radially extending braking surfaces on its opposite faces, a rear axle housing projecting laterally outwardly from the center housing and surrounding the sun gear shaft, a ring gear fixed to the rear axle housing concentric with the sun gear, a pair of nonrotating brake members carried by the rear axle housing and engageable against the brake disc to form a brake, one of the brake members being fixed and the other member being displaceable, a rear axle shaft journalled in the axle housing coaxial with the sun gear shaft, the axle shaft having planetary gears mounted on the end thereof adjacent the sun gear shaft and meshing with the sun gear and ring gear to form a speed reduction gearing, the reduction gearing being located a short distance from the differential and the brake being located between the ring gear and differential, and the inner end of the axle housing being enlarged and secured to the center housing, the enlarged end of the rear axle housing and the center housing forming a chamber beside the center housing receiving the reduction gearing and brake.

References Cited in the file of this patent

UNITED STATES PATENTS

| | | |
|---|---|---|
| 1,315,236 | Parker | Sept. 9, 1916 |
| 1,616,343 | Asprooth et al. | Feb. 1, 1927 |
| 2,340,134 | Maxon et al. | Jan. 25, 1944 |
| 2,868,335 | Panhard | Jan. 13, 1959 |
| 2,953,040 | Christenson et al. | Sept. 20, 1960 |